United States Patent [19]

Martin nee Sturdy et al.

[11] Patent Number: 4,560,733

[45] Date of Patent: Dec. 24, 1985

[54] POLYMERIZATION AND CATALYST

[75] Inventors: Shirley J. Martin nee Sturdy; Max P. McDaniel, both of Bartlesville, Okla.

[73] Assignee: Phillips Petroleum Company, Bartlesville, Okla.

[21] Appl. No.: 656,393

[22] Filed: Oct. 1, 1984

[51] Int. Cl.$^4$ .......................... C08F 4/02; C08F 10/02
[52] U.S. Cl. .................... 526/129; 502/105; 502/120; 526/125; 526/352
[58] Field of Search ............... 502/120, 105; 526/129, 526/125

[56] References Cited

U.S. PATENT DOCUMENTS

| 3,324,095 | 6/1967 | Carrick et al. | 526/130 |
| 3,678,025 | 7/1972 | Birrell | 526/114 |
| 3,709,853 | 1/1973 | Karapinka | 526/130 |
| 3,787,384 | 1/1974 | Stevens et al. | 526/129 |
| 3,798,202 | 10/1971 | Nasser | 260/88.2 |
| 4,121,030 | 10/1978 | Candlin | 526/119 |
| 4,148,754 | 4/1979 | Strobel et al. | 526/129 |
| 4,263,422 | 4/1981 | Lowery et al. | 526/97 |
| 4,383,096 | 5/1983 | Shida et al. | 526/129 |
| 4,391,736 | 7/1983 | Capshew | 526/119 |
| 4,435,518 | 3/1984 | Pennington et al. | 526/129 |

Primary Examiner—Edward J. Smith
Attorney, Agent, or Firm—Howard D. Doescher

[57] ABSTRACT

Polymerization of olefins in the presence of a catalyst system comprising titanium-coating component (A) associated with a milled blend of at least two different silica-containing components having different MI (polymer melt index) potentials and a dihydrocarbylmagnesium compound, and a cocatalyst component (B) comprising an organoaluminum compound. Ethylene polymers having broad molecular weight distribution are obtained using the catalyst defined herein.

6 Claims, No Drawings

POLYMERIZATION AND CATALYST

BACKGROUND OF THE INVENTION

This invention relates to the polymerization of olefins. In another aspect, this invention relates to a novel catalyst system useful for the polymerization of 1-olefins, especially for the production of ethylene polymers. In accordance with another aspect, this invention relates to a method of preparing a titanium-containing composition associated with a particulate silica-containing mixture and a dihydrocarbylmagnesium useful as a catalyst component for the polymerization of 1-olefins. In a further aspect, this invention relates to a process for the polymerization of olefins in the presence of a catalyst comprising a catalyst component (A) which is obtained as the product of a milled mixture of at least two different silica-containing support materials which have different MI (polymer melt index) potentials, a dihydrocarbylmagnesium compound and a halogenated tetravalent titanium compound, and a co-catalyst component (B) comprising an organoaluminum compound. In another aspect, this invention relates to the use of a milled blend of silica-containing supports having widely different MI responses so that an ethylene polymer of broad molecular weight distribution is obtained when used with a dihydrocarbylmagnesium compound, a halogenated tetravalent titanium compound and an organoaluminum cocatalyst.

It is known to polymerize 1-olefins and mixtures thereof in the presence of organometallic catalyst systems in a low pressure process. The activity of an olefin polymerization catalyst is one important factor in a continuous search for a catalyst useful for the polymerization of 1-olefins. It is also desirable that the process used in forming the catalyst be such as to allow ease in preparation and to allow control over the final catalyst formed. In addition, it is desirable in some instances to provide a catalyst for effecting the polymerization of olefins to polymers of broad molecular weight distribution.

The present invention is based upon the discovery that a catalyst having quite different properties is obtained if a milled mixture of different silica-containing components having different physical properties, a dihydrocarbylmagnesium compound, and a titanium tetravalent halogenated compound is used as a catalyst component in the production of ethylene polymers. The ethylene polymers formed according to the invention exhibit broad melt index and broad molecular weight distributions.

Accordingly an object of this invention is to provide an improved process for the polymerization of 1-olefins.

Another object of this invention is to provide a novel and improved catalyst.

Another object of this invention is to provide a two-component catalyst system effected for the polymerization of 1-olefins.

A further object of this invention is to provide a process for the production of ethylene polymers having broad molecular weight distribution.

Other objects, aspects and the several advantages of this invention will become apparent to one skilled in the art upon reading this specification and the appended claims.

SUMMARY OF THE INVENTION

In accordance with the invention, a magnesium-and titanium-containing catalyst component (A) is prepared by milling a blend of at least two different silica-containing supports having greatly different MI (polymer melt index) potentials, either in the presence or absence of an organomagnesium compound, and halogenated tetravalent titanium compound.

Further in accordance with the invention, a polymerization catalyst is provided comprising a titanium-containing component (A) as defined above and a cocatalyst component (B) comprising an organoaluminum compound.

In accordance with one specific embodiment of the invention, a milled particulate silica-containing support of the invention comprises an intimate mixture or blend of at least two different silica-containing supports in which one is activated at high activation temperature and/or has high pore volume (low surface area) and another is activated at low temperature and/or has low pore volume (high surface area).

In one embodiment, the catalyst is formed in a multi-step process comprising (a) intensively milling at least two different silica-containing materials having different MI potentials, (b) contacting the product of (a) with a dihydrocarbylmagnesium compound, and (c) treating the product of (b) with a halogenated tetravalent titanium compound. Solid final product is separated from the reaction mixture, washed with a dry hydrocarbon to remove unreacted titanium compound and dried to obtain catalyst component (A) as a solid particulate material.

In another embodiment, the catalyst is formed in a multi-step process comprising (a) contacting a first silica-containing material with a dihydrocarbylmagnesium compound and a titanium tetravalent halogenated compound, (b) contacting a second silica-containing material having different properties from the first silica with an organomagnesium compound and a halogenated tetravalent titanium compound, and (c) intensively milling the first and second silica-containing materials until an intimate milled blend is obtained. The solid final product can be separated, washed and dried to form catalyst component (A) as in the previous embodiment.

Thus, according to the invention, intimate blends of ethylene polymers having different MI, HLMI, $M_w/M_n$, etc. are prepared by milling the different silica-containing catalyst components and using in a single polymerization process, rather than by conventional mechanical blending of ethylene polymers prepared in separate runs with different catalysts. An advantage of the invention process over conventional blending is reduced energy requirement and a more intimate polymer blend that behaves as a homogeneous polymer with a broad molecular weight distribution.

DETAILED DESCRIPTION OF THE INVENTION

The silica base used in preparing catalyst component (A) can be any silica prepared conventionally, e.g. employing vapor-phase hydrolysis or wet precipitation techniques. The silicas employed according to the invention should be at least two different silicas which have greatly different MI (polymer melt index) potentials. Factors that control MI response of silica include precalcination temperatures of the silica and/or pore volume (surface area) of silica. As used herein in the specification and claims, the term "silica-containing materials which have different MI (polymer melt index) potentials" refers to two (or more) silicas which exhibit different MI (melt index) potentials if, after having been impregnated with the same hydrocarbyl magnesium and tetravalent titanium compounds at essentially the same levels, having been admixed with the same organoaluminum cocatalyst at essentially the same level, and then having been contacted with a reaction mixture comprising a 1-olefin at essentially the same polymerization conditions (temperature, 1-olefin pressure, pressure of $H_2$ if present, reaction time etc.), said silicas produce polyolefins having different melt indexes (melt flows; as determined in accordance with ASTM D1238).

Thus, according to the invention, at least two different silicas are brought together wherein the silica support comprises a first silica activated at high activation temperature, e.g. 600°–900° C. and/or having a high pore volume, such as 1.5 to 3.0 cc/gm (surface area: 100–300 m$^2$g) and at least one other silica activated at a lower activation temperature, for example about 100°–500° C., and/or having a low pore volume, e.g., 0.30 to 1.0 cc/gm (surface area: 400–900 m$^2$g). Generally, as the calcination temperature of the silica increases the activity of catalyst made from the silica also increases.

In carrying out the invention, the silica-containing base can comprise any number of different silica-containing materials. It should be understood that the expression "at least two different silicas" refers to two or more silica-containing materials which have been prepared in a different manner or have different properties and characteristics or for other reasons are different or dissimilar and exhibit the characteristics defined. The base can include silica materials prepared in the same manner or which have similar properties so long as at least two of the silica-containing materials exhibit different MI potentials as defined and set forth hereinbefore.

The silica-containing base used in the preparation of component (A) comprises silica, silica-alumina, silica-boria, silica-thoria, silica-titania, silica-zirconia, or mixtures in which the silica contents is a major portion of at least 50 weight percent and preferably ranges from about 80 to 100 weight percent.

The composition of the silica mixture of the first and second silicas can be of any proportions of the two silicas and is not limited in any respect in relation thereto, except as regards the property of the polymer product desired. This is to say that while equal weight ratios of the first and second silicas are conveniently employed, any weight ratios can be used.

The dihydrocarbylmagnesium compound can be expressed as MgR$_2$ in which each R is the same or different and is a hydrocarbon radical selected from among alkyl, cycloalkyl, aryl, alkaryl, aralkyl, and alkenyl groups having from 1 to about 12 carbon atoms. Exemplary compounds include dimethylmagnesium, diethylmagnesium, di-n-butylmagnesium, didodecylmagnesium, di(4-t-butylphenyl)-magnesium, diisopropenylmagnesium, and ethylbutylmagnesium, and mixtures thereof.

The halogenated, tetravalent titanium compound can be represented by TiX$_n$(OR')$_{4-n}$ in which X is bromine, chlorine, or iodine, R' is a hydrocarbon radical containing from 1 to about 12 carbon atoms selected from among alkyl, cycloalkyl, aryl, alkaryl, and aralkyl, and n is an integer of 3 or 4. Exemplary compounds include titanium tetrachloride, titanium tetrabromide, titanium tetraiodide, titanium bromotrichloride, titanium dichlorodiodide, titanium bromotriodide, titanium tribromo-n-butoxide, titanium trichloroethoxide, and the like, and mixtures thereof. A particularly preferred compound is titanium tetrachloride because of its availability and efficacy.

The cocatalyst component B can be an organoaluminum compound which can be expressed as R''$_n$AlX$_{3-n}$ which R'' is a hydrocarbon radical having from 1 to about 20 carbon atoms, X is a monovalent radical selected from among the halogens and hydrogen, and n is an integer of 0 to 3. Examples of specific compounds include trimethylaluminum, triisobutylaluminum, tridodecylaluminum, tricyclohexyaluminum, triphenylaluminum, tribenzylaluminum, diethylaluminum chloride, ethylaluminum dichloride, isopropylaluminum dibromide, diisobutylaluminum hydride, and the like, and mixtures thereof.

The mole ratio of silica to tetravalent titanium compound can range from about 1:1 to about 1000:1, preferably from about 10:1 to about 300:1.

The mole ratio of tetravelent titanium compound to dihydrocarbylmagnesium compound can range from about 0.1:1 to about 20:1, preferably from about 0.2:1 to about 10:1.

The amount of cocatalyst component B employed with the catalyst during polymerization can vary rather widely from about 0.005 mmole to about 10 mmole per liter of reactor contents. However, particularly good results are obtained at a more preferred range from about 0.01 mmole to about 2.5 mmole per liter of reactor contents.

The milling employed in preparing catalyst component (A) is to be distinguished from ordinary admixing, shaking or tumbling, or the like. The milling refers to the strong and thorough mixing of the solid ingredients together, milling under milling conditions in such a manner as to afford significant reduction in the particle size. Milling can be by means of a ballmill, vibrating ballmill, tower mill, or the like. A typical specific mill employable is a vibatory mill, such as a Vibratom manufactured by Siebtechnik G.M.B.H.

Milling can employ ambient, vacuum or other subatmospheric or superatmospheric pressure in an inert dry atmosphere such as nitrogen, argon or the like. Milling can result in heat being produced and, where needed, cooling means can be employed to avoid excessive temperatures which would adversely affect catalyst performance. Milling times can range widely, such as from about 1 minute to about 5 hours, and presently preferred from about 2 minutes to about 3 hours because the catalysts are sufficiently activated after such milling times. No advantage in activity is gained by exceeding the specified times. Vibratory milling typically takes a shorter time than rotary ballmilling.

Catalyst component (A) is prepared by mixing at least two different silicas in finally divided solid form with the dihydrocarbylmagnesium compound and a tetravalent titanium compound under conditions which will form a magnesium- and titanium-containing solid product. This can be accomplished in several ways. In one manner, at least two different finally divided silicas having different physical properties as set forth herein are admixed and subjected to intensive milling to form an intimate mixture of the silicas followed by contacting the milled blend with dihydrocarbylmagnesium and tetravalent titanium compounds. In another manner of preparation, each of the different silicas to be used as part of the silica support is individually contacted with dihydrocarbylmagnesium and tetravalent titanium compounds and the resulting product from each is blended and subjected to intensive milling to form an intimate mixture of the different catalyst composites.

In still another manner of preparation, at least one of the silica is contacted with dihycrocarbylmagnesium and tetravalent titanium compounds and the resulting product is mixed with at least one different silica-containing material, which has not been contacted with magnesium and/or titanium compounds. The mixture thus formed is subjected to intensive milling and, if desired, the milled composite can be contacted with additional magnesium and/or titanium compounds.

In carrying out the various steps of the instant process, a suitable inert diluent can be used, such as aliphatic or cycloaliphatic hydrocarbon, such as butane, pentane, hexane, heptane, cyclohexane, methylcyclohexane as well as aromatic hydrocarbons including benzene and toluene. Generally, any well-known inert hydrocarbon diluent can be used.

The contacting, mixing and reacting steps of combining the silica support with magnesium and titanium compounds can be carried out generally at temperatures in the range of about $-50°$ C. to about $200°$ C. with the decomposition temperatures of tetravalent titanium compounds and other organometallic compounds determining the limits. The mixing and contacting temperatures generally employed often range from about $20°$ C. to about $150°$ C.

The length of the contacting periods can vary greatly with the time period generally ranging from about one-fourth to about ten hours.

The polymerization process can be effected in a batchwise or in a continuous fashion by employing any conventional mode of contact between the catalyst system and the monomer or monomers. Thus, the monomer can be polymerized by contact with the catalyst system in solution, in suspension, or in gaseous phase at temperatures ranging from about $20°-200°$ C. and pressures ranging from about atmospheric to about 1,000 psia (6.9 MPa). The polymerization process can be conducted batchwise such as in a stirred reactor or continuously such as in a loop reactor under turbulent flow conditions sufficient to maintain the catalyst in suspension.

The ethylene polymers produced are normally solid ethylene homopolymers or polymers prepared by copolymerizing ethylene with at least one aliphatic 1-olefin containing from 3 to about 10 carbon atoms or a conjugated acyclic diolefin containing 4 to 5 carbon atoms. In such polymers, the ethylene content can range from about 80 to 100 mole percent. The polymers can be converted into various useful items including films, fibers, pipe, containers, and the like by employing conventional plastics fabrication equipment.

It is especially convenient when producing ethylene polymers to conduct the polymerization in the presence of a dry hydrocarbon diluent inert in the process such as isobutane, n-heptane, methylcyclohexane, benzene, and the like at a reactor temperature ranging from about $60°$ C. to about $110°$ C. and a reactor pressure ranging from about 250 to about 600 psia (1.7–4.1 MPa). In such a process, particle form polymerization, the polymer is produced as discrete solid particles suspended in the reaction medium. The polymer can be recovered, can be treated to deactivate and/or remove catalyst residues, can be stabilized with an antioxidant system, and can be dried, all as known in the art to obtain the final product. Also, molecular weight controllers such as hydrogen can be employed in the reactor as is known in the art to adjust the molecular weight of the product, if desired.

A further understanding of the present invention and its advantages will be provided by the following examples.

EXAMPLE I

In this example the preparation of several silica-supported olefin polymerization catalysts having different pore volume and having been calcined at different temperatures is described.

Catalyst A:

About 10 grams of Davison Type silica 952 (pore volume PV, determined by alcohol absorption: 1.6–1.7 cc/gram; surface area SA, determined by the $BET/N_2$ method: 280 $m^2$/gram; average pore diameter calculated from 4PV/SA: about 220A) were activated by heating in air for about 3 hours at about $900°$ C. About 4.5 grams of the calcined silica (labeled silica A) were slurried in about 20 ml of dry n-heptane. First 2.1 ml of a 12.6 weight percent solution of dibutylmagnesium in n-heptane and subsequently a mixture of 0.5 ml of $TiCl_4$ and 4.5 ml of n-heptane were added to the slurry with slight agitation. The slurry containing the impregnated, brown silica catalyst was heated to boiling for 10 minutes. After cooling, the supernatant solution was decanted, and the solid catalyst was washed (followed by decantation of the wash liquid) 4 times with n-heptane. Finally the catalyst was dried by complete evaporation of the liquids in a stream of flowing nitrogen. The dried Catalyst A was stored in a bottle filled $N_2$.

Catalyst B:

About 10 grams of spray-dried silica-titania cogel (3.5 weight percent $TiO_2$; alcohol pore volume: about 0.8 cc/gram, $BET/N_2$ surface area: about 400 $m^2$/gram; calculated average pore diameter; about 71A) were calcined for about 3 hours in air at about $200°$ C. 5.5 grams of this dried silica (labeled silica B) were slurried in about 20 ml of dry n-heptane. Then 2.5 ml of a 12.6 weight percent solution of dibutylmagnesium in n-heptane and finally a mixture of 0.5 ml of $TiCl_4$ and 4.5 ml of n-heptane were added with slight agitation. The subsequent boiling, decanting, washing and drying was carried out in accordance with the procedure described for Catalyst A. The dry Catalyst B was stored in a bottle under dry $N_2$.

Catalyst C:

2.0 grams of silica A and 2.0 grams of silica B were mixed and ground with mortar and pestle for about 2 minutes in a desiccated glove box. This mixture was slurried in dry n-heptane as described earlier. First 1.7 ml of a 12.6 weight percent dibutylmagnesium and then 0.5 ml of $TiCl_4$ plus 4.5 ml of n-heptane were slowly added. Boiling, decanting, washing and drying was carried out in accordance with the procedure described for Catalyst A. The dry Catalyst C was stored in a bottle under dry $N_2$.

Catalyst D:

1.5 grams of Catalyst A and 1.5 grams of Catalyst B were mixed with mortar and pestle for about 2 minutes under dry nitrogen.

EXAMPLE II

In this example the polymerization of ethylene on Catalysts A, B, C and D is described. All polymerization runs were carried out in a stirred 1-gallon stainless steel autoclave (Autoclave Engineering, Inc., Erie, PA) with 0.5–1.1 grams of catalyst, 1.2 liters of isobutane, 1.0 ml of a 15 weight percent solution triisobutylaluminum cocatalyst in n-heptane, 100–200 psig ethylene, 100 psig hydrogen, at abot 80° C., for about 60 minutes. Results of polymerization runs are summarized in Table I.

TABLE I

| Run | Catalyst Type | Catalyst grams | Ethylene Press (psig) | Productivity[1] (g/g/hr) | PE Melt Index MI[2] | PE Melt Index HLMI[3] | HLMI[4] MI | PE Molecular Weight Mw | PE Molecular Weight Mn | HI[6] | PE Density (g/cc) |
|---|---|---|---|---|---|---|---|---|---|---|---|
| 1 | A | 0.5512 | 100 | 236 | 0.59 | 28.2 | 48 | 162,000 | 6,500 | 9.8 | 0.967 |
| 2 | B | 0.586 | 100 | 92 | —[7] | 0.50 | — | 478,000 | 20,000 | 23.9 | 0.960 |
| 3 | C | 0.740 | 100 | 145 | 0.048 | 3.1 | 65 | 308,000 | 18,000 | 17.1 | 0.962 |
| 4 | D | 0.549 | 100 | 133 | 1.70 | 72.9 | 43 | 173,000 | 14,000 | 12.4 | 0.974 |
| 5 | A | 0.638 | 200 | 633 | 0.056 | 3.46 | 62 | — | — | — | — |
| 6 | B | 1.118 | 200 | 109 | —[7] | 0.073 | — | — | — | — | — |
| 7 | C | 0.7869 | 200 | 269 | —[7] | 0.33 | — | — | — | — | — |
| 8 | D | 0.64 | 200 | 288 | 0.030 | 2.2 | 73 | — | — | — | — |

[1] grams PE/grams catalyst/time (hours)
[2] determined in accordance with ASTM D1238-65T, Condition E
[3] determined in accordance with ASTM D1238-65T, Condition F
[4] a measure of molecular weight distribution, the higher the HLMI/MI ratio the broader the molecular weight distribution
[5] weight average molecular weight (Mw) and number weight molecular weight (Mn) were determined from gel permeation chromatograms according to the procedure described by G. Kraus et al in W. J. Poly. Sci 10, 657 (1972)
[6] ratio of Mw to Mn; or measure of molecular weight distribution; the higher HI the broader the molecular weight distribution;
[7] Too low to be determined Data in Table I show that surprisingly the HLMI/MI ratio of PE formed or mixed Catalyst C is about 35% higher and the HI of the same polymer is about 74% higher than those of PE produced on Catalyst A, (compare runs 3,1).

That which is claimed is:

1. A method of producing a polymerization catalyst which comprises forming a component (A) by:
   (1) contacting a first silica activated by calcining at a temperature in the range of about 600° to 900° C. and having a pore volume ranging from 1.5 to about 3 cc/g and surface area ranging from about 100 to about 300 m$_2$/g with dialkylmagnesium and TiCl$_4$,
   (2) contacting a second silica activated by calcining at a temperature of about 100° to about 500° C. and having a pore volume of from about 0.3 to about 1 cc/g and a surface area ranging from about 400 to about 900 m$_2$/g with dialkylmagnesium and TiCl$_4$,
   (3) blending about equal amounts of said first and second silicas and subjecting the resulting blend to milling to form component (A), and
   (4) combining component (A) formed in step (3) with a cocatalyst component (B) comprising trialkylaluminum.

2. A method according to claim 1 wherein said dialkylmagnesium is dibutylmagnesium and said trialkylaluminum is triisobutylaluminum.

3. A process for the production of ethylene polymers having broad molecular weight distribution which comprises contacting ethylene under polymerization conditions with the catalyst produced by claim 1.

4. A method of producing a polymerization catalyst which comprises forming a component (A) by:
   (1) blending about equal parts of a first silica activated by calcining at a temperature of about 600° to about 900° C. and having a pore volume of from about 1.5 to about 3 cc/g and a surface area ranging from about 100 to about 300 m$_2$/g with a second silica activated by calcining at a temperature of about 100° to about 500° C. and having a pore volume of from about 0.3 to about 1 cc/g and a surface area ranging from about 400 to about 900 m$_2$/g and subjecting the resulting blend to milling,
   (2) contacting the milled blend of (1) with dialkylmagnesium and TiCl$_4$ to form component (A), and
   (3) combining component (A) formed in step (2) with a cocatalyst component (B) comprising trialkylaluminum.

5. A method according to claim 4 wherein said dialkylmagnesium is dibutylmagnesium and said trialkylaluminum is triisobutylaluminum.

6. A process for the production of ethylene polymers having broad molecular weight distribution which comprises contacting ethylene under polymerization conditions with the catalyst produced by claim 4.

* * * * *